United States Patent [19]

Hardway, Jr.

[11] 3,713,436
[45] Jan. 30, 1973

[54] METHOD AND APPARATUS FOR MEASURING MECHANICAL PROPERTIES OF THE RESPIRATORY SYSTEM

[75] Inventor: Edward V. Hardway, Jr., Houston, Tex.

[73] Assignee: Spearhead, Inc., Houston, Tex.

[22] Filed: Oct. 23, 1970

[21] Appl. No.: 83,421

[52] U.S. Cl. ................................................128/2.08
[51] Int. Cl. ..............................................A61b 5/08
[58] Field of Search ............128/2.08, 2.07, 2 R, 2 S; 73/38, 194, 231

[56] References Cited

UNITED STATES PATENTS 3,410,264  11/1968  Frederik ..........................128/2 R
3,598,111   8/1971  Kahn et al. ....................128/2.08
2,089,432   8/1937  Ryan ..................................73/38

FOREIGN PATENTS OR APPLICATIONS 192,367  8/1967  U.S.S.R. ..................................2.08/
199,328  12/1967  U.S.S.R. ..................................2.08/

Primary Examiner—Kyle L. Howell
Attorney—Hyer, Eickenroht, Thompson & Turner

[57] ABSTRACT

Method and apparatus are disclosed for measuring respiratory resistance and stiffness by forcing a pulsating volume of gas at a known amplitude and frequency into and out of a respiratory system being examined, and sampling the gas pressure at the mouth of the patient in response to the pulsating volume at selected points in time when the rate of flow of the gas and volume displacement are peaked. Apparatus is disclosed for determining when such flow and displacement are peaked, and for converting the sampled pressures into direct readings of respiratory resistance and dynamic stiffness. Also, apparatus is disclosed for cancelling out of the sampled pressures values equal to residual pressure of the respiratory system by averaging the sampled pressure over at least two successive, alternate, sampling times.

19 Claims, 8 Drawing Figures

PATENTED JAN 30 1973 3,713,436

EDWARD V. HARDWAY, JR.
INVENTOR.

BY Hyer, Eickenroht,
Thompson, & Turner
ATTORNEYS

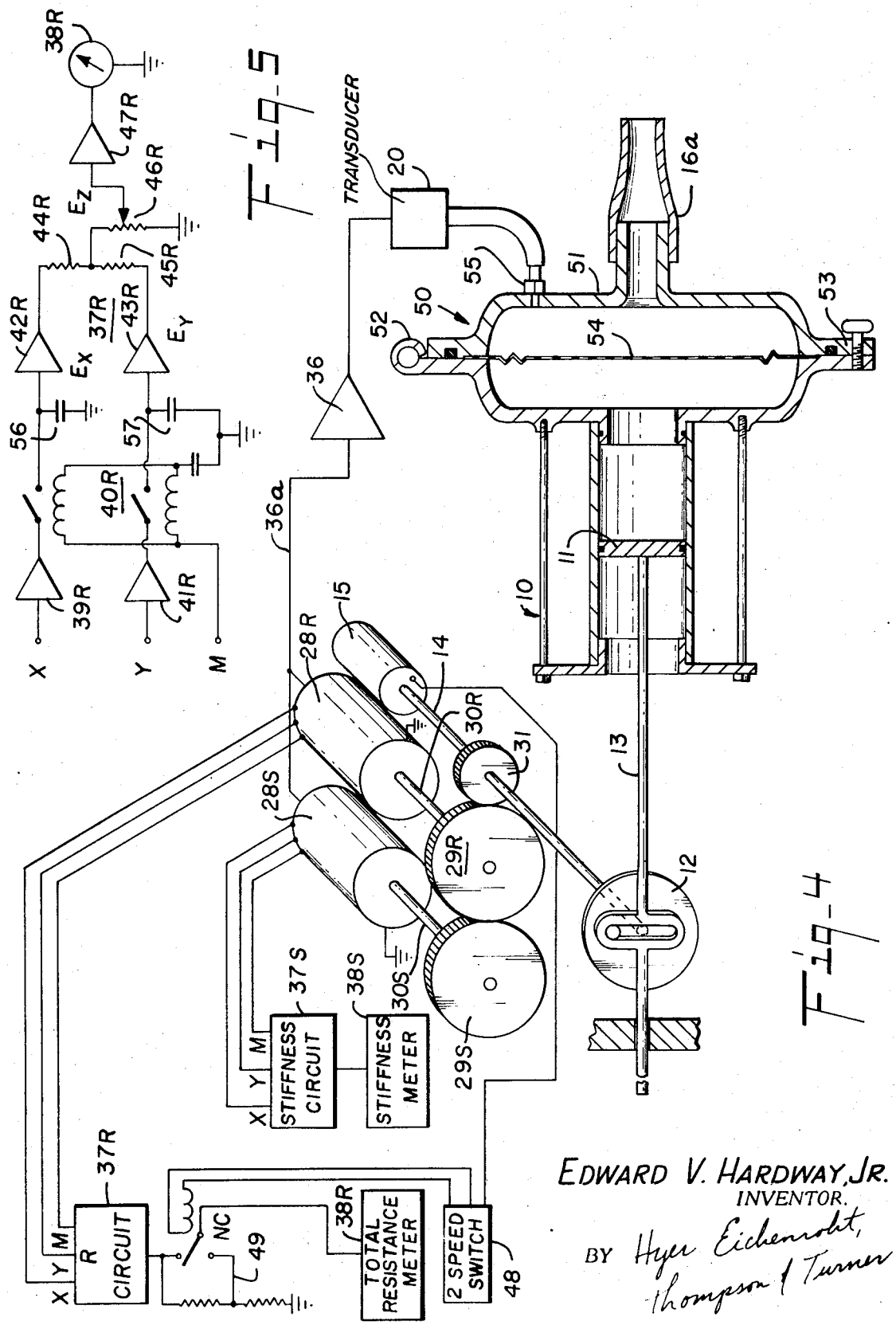

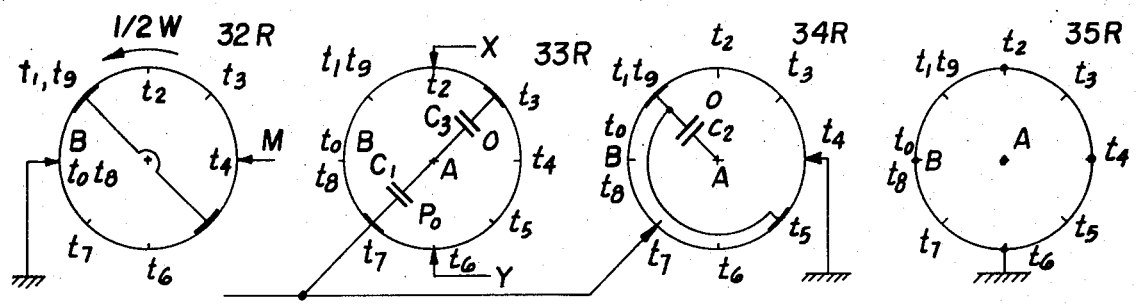
Fig. 8
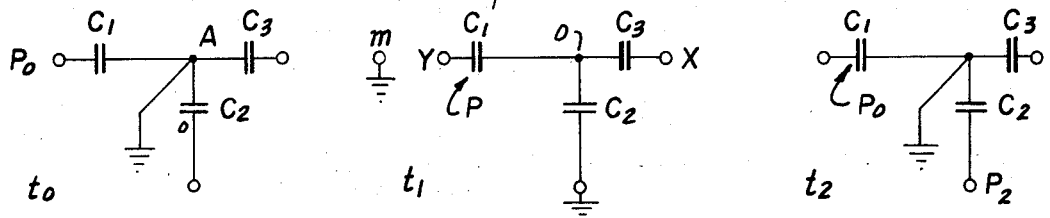
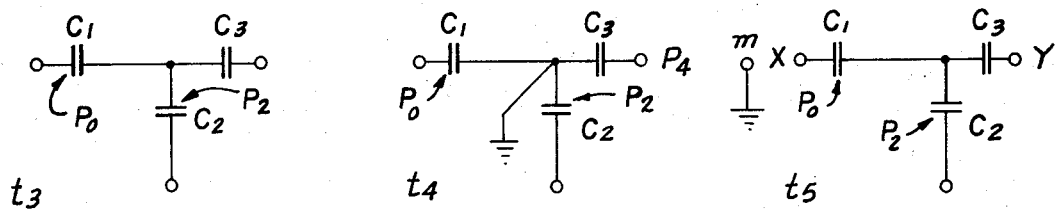
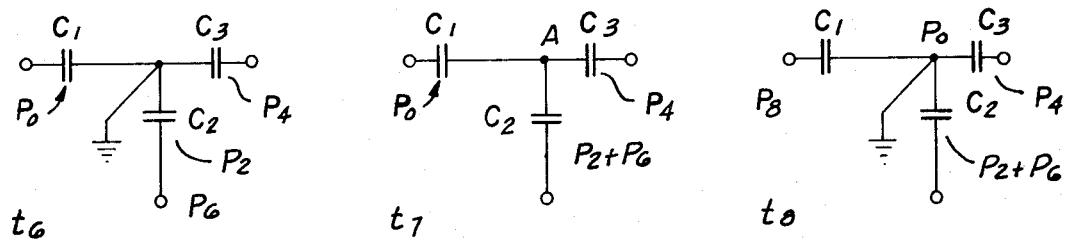
Fig. 6
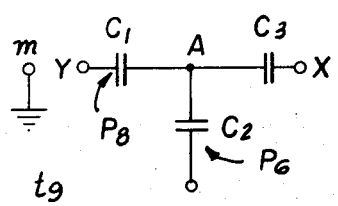
| t | Ex | Ey | Ez |
|---|---|---|---|
| 0 | 0 | 0 | 0 |
| 1 | 0 | $P_0$ | $1/2\ P_0$ |
| 2 | 0 | $P_0$ | $1/2\ P_0$ |
| 3 | 0 | $P_0$ | $1/2\ P_0$ |
| 4 | 0 | $P_0$ | $1/2\ P_0$ |
| 5 | $P_0 - P_2$ | $P_4 - P_2$ | $1/2(P_0 + P_4 - 2P_2)$ |
| 6 | $P_0 - P_2$ | $P_4 - P_2$ | $1/2(P_0 + P_4 - 2P_2)$ |
| 7 | $P_0 - P_2$ | $P_4 - P_2$ | $1/2(P_0 + P_4 - 2P_2)$ |
| 8 | $P_0 - P_2$ | $P_4 - P_2$ | $1/2(P_0 + P_4 - 2P_2)$ |
| 9 | $P_4 - P_6$ | $P_8 - P_6$ | $1/2(P_4 + P_8 - 2P_6)$ |
| 10 | $P_4 - P_6$ | $P_8 - P_6$ | $1/2(P_4 + P_8 - 2P_6)$ |
Fig. 7
INVENTOR.
EDWARD V. HARDWAY JR.
BY
Hyer, Eichenroht
Thompson, & Turner
ATTORNEYS

METHOD AND APPARATUS FOR MEASURING MECHANICAL PROPERTIES OF THE RESPIRATORY SYSTEM

This invention relates to methods and apparatus for physiological testing of the human respiratory system and in one of its aspects to such method and apparatus for measuring mechanical properties of the human respiratory system, such as total respiratory resistance and dynamic stiffness. In another aspect this invention relates to novel methods and apparatus for measuring respiratory resistance and stiffness by forced oscillation techniques.

Both the measurement of total respiratory resistance and dynamic stiffness of the respiratory system may be important in determining the condition of the lung and the presence of related diseases. The measurement and indication of respiratory stiffness and of respiratory compliance are considered equivalent since one is simply the reciprocal of the other. In measuring only total respiratory resistance of the human respiratory system, forced oscillation techniques are generally employed. One commercially available forced oscillation instrument includes a loudspeaker connected to a mouthpiece via a flow measuring pneumotach. The mouthpiece also connects through a long tube to the atmosphere to permit breathing. An alternating pressure at 3 Hz. is created by the loudspeaker and this pressure causes an alternating flow through the mouthpiece to and from the patient's airway and lung. The level of the alternating pressure at the mouthpiece is measured by a pressure transducer. A differential pressure transducer is connected across the pneumotach, and an amplified electrical signal proportional to the differential pressure across the pneumotach is obtained. The component of the measured alternating pressure proportional to respiratory resistance is the pressure at the instant of zero volume acceleration, zero volume and peak flow with respect to the 3 Hz. oscillation. This point is determined by differentiating the electrical signal and determining the point of zero volume acceleration with a zero crossover detector. The total respiratory resistance is then computed as the ratio of the amplitude of the driving pressure at the instant of peak alternating flow to the amplitude of the induced peak alternating flow.

The above described apparatus has severe limitations restricting its widespread usage. The differential pressures which must be measured across the pneumotach to determine flow are extremely small, especially with a sick patient with high respiratory resistance. Two extremely sensitive pressure transducers are thus required. The linear pneumotach with its multiplicity of small capillaries is easy to contaminate by phlegm and other breath particles. Also, a high performance recorder must be used to insure accuracy, and graphical or manual manipulations are required to provide the desired result.

The change of stiffness or compliance of the human lung with breathing frequency has been found by medical researchers to be closely related to the degree of obstruction of the peripheral airways in the lungs. Presently known methods of determining respiratory stiffness involve the use of a large and costly body plethysmograph or "body box", and an esophageal balloon swallowed by the subject being tested. The body plethysmograph is so costly and the procedures employing it are so time consuming that they are not practical for widespread usage in clinics or in health screening. Forced oscillation apparatus for measuring the dynamic compliance or stiffness of the entire respiratory system has not previously been available to medical researchers and practitioners.

It is thus an object of this invention to provide an improved method and apparatus for determining respiratory resistance by utilizing forced oscillation techniques.

It is another object of this invention to provide a method and apparatus for determining respiratory stiffness by utilizing forced oscillation techniques.

It is another object of this invention to provide such methods and apparatus which do not employ relatively expensive and complicated components such as a pneumotach, differential pressure transducers, differentiating circuitry and zero crossover detectors.

It is another object of this invention to provide such methods and apparatus which are suitable both for laboratory use and for use in routine medical examinations.

It is another object of this invention to provide such methods and apparatus wherein direct readings can be provided of respiratory resistance and stiffness, even at different frequencies of applied oscillations.

It is another object of this invention to provide such methods and apparatus in which respiratory stiffness is measured without the need of a "body box" or esophageal balloon swallowed by the subject.

It is another object of this invention to provide such methods and apparatus in which the patient s breath can be isolated from the apparatus to facilitate cleaning and disinfecting of the apparatus between successive patients.

It is another object of this invention to provide such methods and apparatus in which sampled pressures not generated in response to the forced oscillations are automatically cancelled.

These and other objects and advantages of this invention are accomplished in accordance with this invention by providing a controlled volume pump generating sinusoidal volume pulsations wherein both the volume velocity or flow and the volume are precisely known and predetermined with respect to amplitude, frequency and phase, making it unnecessary to differentiate the flow signal to determine the instants of peak or zero flow. It is only necessary to sample the pressure level signal from a single transducer at known points of the oscillatory volume cycle to obtain the electrical signals necessary to determine respiratory resistance and dynamic stiffness. The points of the oscillatory cycle where the sampled pressures are taken are preferably determined by indexing positions of a rotary driving mechanism driving the which positions are directly related to conditions of the oscillating volume. The indexed positions also have a fixed relationship to resistive and reactive components of the sampled alternating pressures. Circuit means are also provided so that these sampled pressures are converted to direct readings or recordings of respiratory resistance or stiffness, and no graphical interpretation of an oscillating line on a graph is necessary. During these measurements, it is preferable for the patient to hold his breath for short periods, as he would during the making of a Roentgenogram of his lungs. Means are provided for cancelling errors due to linear and slow variations of signal level caused by voluntary or involuntary pressure responses of the patient unrelated to the forced volume oscillation. Also, since no pneumotach is required, an easily cleaned and disinfected limp diaphragm may be used to isolate the patient from the apparatus, thus greatly reducing the cleaning and sanitation problem.

In the drawings, wherein is illustrated a preferred embodiment of this invention, and wherein like reference numerals are used throughout to designate like parts:

FIG. 4 is an overall schematic of the preferred form of the apparatus of this invention, including a partial sectional view of the controlled volume pump and the limp diaphragm;

FIG. 5 is a more detailed schematic of the electrical circuits for direct reading of respiratory resistance with the baseline pressure cancelled;

FIG. 6 is a schematic of one form of the circuits for sampling the alternating pressure at the various sampling times of FIG. 3 to provide the input signals to the circuit of FIG. 5;

FIG. 7 is a box chart showing the electrical potential stored in the various storage devices of FIG. 5 at different sampling times; and FIG. 8 is a schematic diagram of a capacitor memory unit which is one form of a switching circuit utilized in this invention to provide the stored values of FIG. 7 for readout of respiratory resistance less baseline pressure.

Figure 1:
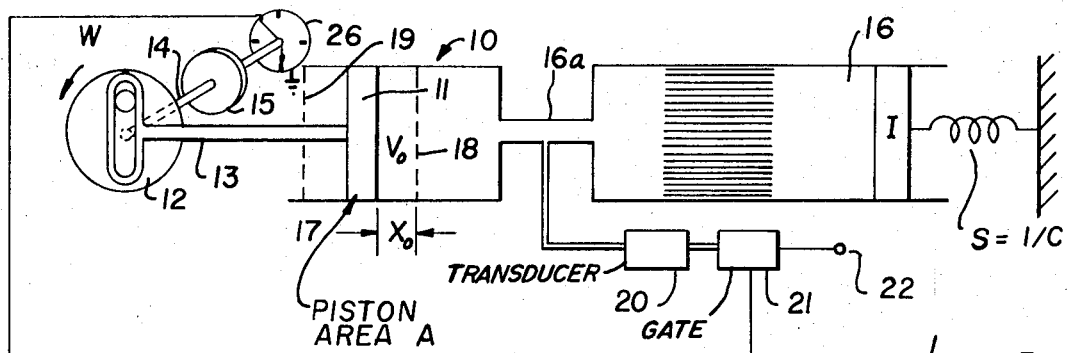
FIG. 1 is a schematic diagram of the apparatus of this invention and includes an equivalent circuit or mechanical analogy of a respiratory system being tested.

Referring to FIG. 1, a controlled volume pump 10 is shown as including a piston 11 driven in a constant sinusoidal motion by a scotch yoke 12. Scotch yoke 12 is connected between a piston rod 13 and a shaft 14 of a synchronous rotary motor 15. Pump 10 is shown as being connected to pump gas into and out of a respiratory system 16 represented in schematic form in FIG. 1. Scotch yoke 12 converts the rotary motion of motor 14 into reciprocating motion to reciprocate piston 11 from its center position 17 a maximum distance $X_0$ alternately to positions 18 and 19. Piston 11 moves at a constant frequency f determined by motor 14 which has a constant angular velocity w to provide a constant peak volume $V_0$ of gas which is forced into and out of the respiratory system. The rotary position of the shaft of motor 14 has a fixed relationship with respect to the position of piston 11 so that with each 360° rotation of the shaft piston 11 will move from its center position 17 (represented by 0° rotation of the shaft) to position 18 (represented by 90° rotation of the shaft) back to its center position 17 (now represented by 180° rotation of the shaft) to position 19 (represented by 270° rotation of the shaft) and back to center position 17 (represented by 360° rotation of the shaft). When piston 11 is in center position 17 the flow of gas $\dot{V}$ into or out of system 16 is peaked; however, the volume V of gas is zero. Conversely, when piston 11 is in extreme positions 18 and 19, rate of flow $\dot{V}$ is zero and volume V is peaked either in the positive direction at position 18 or the negative direction at position 19. Thus, as long as the amplitude of the forced volume is constant the moments of peak flow or peak volume can be determined by the position of shaft 14.

In the mechanical analogy of respiratory system 16 in FIG. 1, gas is pumped into and out of the airways and lung through a mouthpiece or inlet 16a. At the levels of pressure and volume involved, gas may be considered incompressible. Thus, the total respiratory resistance R to this flow is a combination of airway resistance, tissue resistance and the resistance offered by the thoracic cage, all of which create back pressure com-ponents on the gas forced in by pump 10, which are in phase with the oscillatory flow of gas. The respiratory stiffness S or its reciprocal compliance C, analogous in action to a spring, offers a back pressure in phase with volume displacement. The inertial impedance of the respiratory system causes back pressure component 180° out of phase with the stiffness component and is proportional to volume acceleration. However, at the low frequencies used inertial impedance may be neglected.

Thus, by sampling the gas pressure at inlet 16a, such as by a transducer 20, resistive and reactive components of pressure proportional to respiratory resistance R and stiffness S can be obtained. If this pressure is sampled when piston 11 is in center position 17, when rate of flow is peaked, the value of alternating pressure Pa obtained (hereinafter called Pr) will be substantially proportional to respiratory resistance R by the relationship:

$$R = Pr/V_0 w \quad (1)$$

where $Pr$ = the pressure at 16a when V is peaked; $V_0$ = the peaked value of the alternating volume of gas from pump 10 (being a fixed known value determined by the product of the area of piston 11 and $X_0$); and w is angular velocity of motor 15 in radians per second.

Similarly, if the pressure at inlet 16a is sampled when piston 11 is in one of positions 18 or 19, when volume is peaked, then the value of the alternating pressure Pa (hereinafter referred to as Ps) obtained will be substantially proportional to dynamic stiffness S by the relationship: $S = Ps/V_0 \quad (2)$ where Ps is the pressure at 16a when V is peaked, and $V_0$ is the constant peaked value of the alternating volume of gas.

Figure 2:
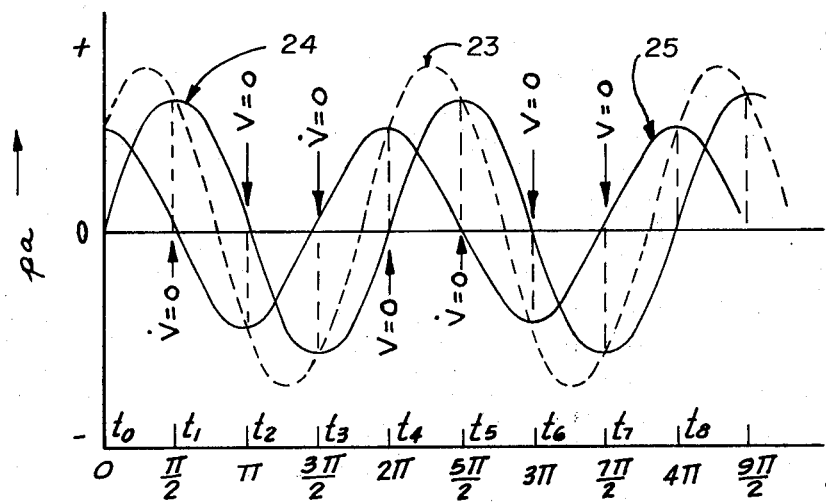
FIG. 2 is a graph showing curves of alternating respiratory pressure at the inlet to the respiratory system, and volume velocity or flow and volume displacement of the oscillating volume.

The relationships of formulas (1) and (2) are graphically illustrated in FIG. 2. Curve 23 represents the alternating pressures Pa induced by the alternating volume of gas from pump 10 and as measured by transducer 20 at inlet or mouthpiece 16a, and is plotted as a function of sampling times $t_0$-$t_9$ corresponding to different positions of piston 11 and shaft 14. Curve 24 represents the volume displacement of the alternating volume at times $t_0$-$t_9$, and curve 25 represents the flow of the alternating volume of gas at times $t_0$-$t_9$. If times $t_0$-$t_9$ are selected at the zero crossovers of each of curves 24 and 25 and pressure Pa sampled at these times, then the values of Pr and Ps are respectively obtained. Flow is peaked when volume is zero and vice versa.

Means are thus provided for sampling the alternating pressure Pa and indexing the relative positions of piston 11 corresponding to zero crossover or peaks of curves 24 and 25. As illustrated schematically in FIG. 1, an indexing means such as rotary disk 26 can be connected to shaft 14 and connected to operate a switching or gate circuit 21. For example, disk 26 can be a rotary switch with terminals 90° apart or a collimator with slits 90° apart for passing light from light sources (not shown) on one side to a plurality of photocells (not shown) on the other side which then emit pulses responding to each of the peaks or zero crossovers of curves 24 and 25. Gate circuit 21 is also connected to the output of transducer 20 to provide an output at a terminal 22 corresponding to the alternating pressure Pa sampled at each of times $t_0$–$t_9$. Since the sampled value of Pa at the even numbered times $t_0$, $t_2$, $t_4$, etc., occur when $V = 0$ and $\dot{V}$ is peaked, then these values will be proportional to respiratory resistance R in accordance with formula (1). Similarly, since the sampled values of Pa at times $t_1$, $t_3$, $t_5$, etc., occur when V is peaked and $\dot{V} = 0$, these sampled values will be proportional to dynamic stiffness in accordance with formula (2).

Figure 3:
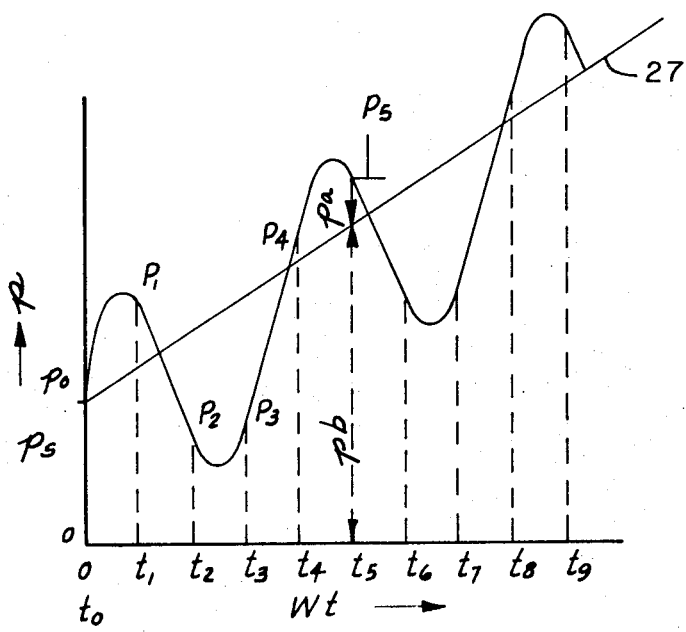
FIG. 3 is a graph showing the pressure sampled at the inlet to the respiratory system at selected sampling times, superimposed on the residual or baseline pressure of the respiratory system.

Since it is preferred that the patient hold his breath when utilizing the present invention, the pressures sampled by transducer 20 will include residual or baseline pressure Pb of the respiratory system. Such a pressure is illustrated by line 27 in FIG. 3 having the sampled alternating pressure Pa superimposed on it by curve 23, and Pb may change with time during successive sampling cycles $t_0$–$t_9$ at a linear rate. In order to provide a direct reading of respiratory resistance and stiffness, novel sampling circuits and methods are provided by this invention to cancel the baseline pressures from the sampled pressures during each sampling cycle provided that this pressure is substantially constant. A constant level of pressure Pb can be cancelled by averaging the sampled pressures at successive, alternate, sampling times so that, for example, $Pa = \frac{1}{2}(P_0 - P_2)$ or $\frac{1}{2}(P_4 - P_6)$. If Pb is changing in a linear manner as shown in FIG. 3, it is preferred to average at least two successive pairs of sampled pressures, with the end pressure of the first pair sampled being the first pressure of the second pair sampled. By this method the effect of a linearly changing baseline pressure is cancelled. In the present embodiment this is done by taking an average of three alternate sampled values (i.e., $P_0$, $P_2$ and $P_4$) with double the intermediate sampled value being subtracted from the sum of the alternate sampled values on each side of the intermediate sampled value. For example, two successive, alternate positive peaks $P_0$ and $P_4$ would be added, and twice the negative alternate intermediate peak $P_2$ would be subtracted from this to give the value of respiratory resistance less the linearly changing of baseline pressure. Using this method the equation for Pr, less Pb would be $$Pr = \frac{1}{4}[P_{4n} + P_{(4n+4)} - 2P_{(4n+2)}] \quad (3)$$

and the equation for Ps, less Pb would be $$Ps = \frac{1}{4}[P_{(4n+1)} + P_{(4n+5)} - 2P_{(4n+3)}] \quad (4)$$

The averaging and indicating process described is done continuously although it may require up to two cycles to stabilize the output.

FIG. 4 illustrates one embodiment of this invention in which Pb is cancelled and direct readings of R and S are provided by the method described. In this embodiment a pair of capacitor memory units 28R and 28S are connected to shaft 14 of motor 15 by a gear 29R connected to shaft 30R of capacitor memory unit 28R, and a gear 29S connected to shaft 30S of capacitor memory unit 28S. Gears 29R and 29S are driven by shaft 14 through a gear 31 connected to shaft 14 and gears 29R and 29S are sized with respect to gear 31 to provide a 2–1 reduction so that for each 90° rotation of shaft 14, shafts 30R and 30S are rotated 45°. Each of capacitor memory units 28R and 28S includes four rotary discs connected to their respective shafts, such as discs 32R, 33R, 34R and 35R in FIG. 8 each connected to shaft 30R. For purposes of illustration, only the disc of capacitor memory unit 28R are shown since the corresponding disc of capacitor memory unit 28S are identical except that memory unit 28S runs ahead or lags behind memory unit 28R by 45° corresponding to the 90° out of phase relationship of curves 24 and 25. Each of discs 32R, 33R, 34R and 35R include eight terminals 45° apart which, also for purposes of illustration, are labeled with the sampling times $t_0$–$t_9$ corresponding to when that terminal is located at the position labeled B adjacent each of discs 32R–35R in FIG. 8. Thus, discs 32R–35R in FIG. 8 are shown in the position they would be in at time $t_0$. Disc 32R is connected between terminal M in the circuitry shown in FIG. 5, and ground and at times $t_1$, $t_5$ and $t_9$ conducts terminal M to ground for reasons hereinafter described. Discs 33R and 34R are connected through line 36a to pressure transducer 20 through an amplifier 36, disc 33R being connected between line 36a and terminals X and Y of FIG. 5, and disc 34R being connected between line 36a and ground. Disc 33R includes two storage capacitors $C_1$ and $C_2$ connected together at one of their terminals at point A and connected at their other terminals to opposite terminals $t_7$ and $t_3$ of disc 33R. Point A is also connected to one terminal of a capacitor $C_3$ mounted on disc 34R and capacitor $C_3$ is connected at its other terminal to terminals $t_1$, $t_9$ and $t_5$ of disc 34R. Disc 35R is connected between point A and ground, and conducts point A to ground when terminals $t_1$, $t_2$, $t_4$, $t_6$ and $t_8$ are at point B.

The output terminals X, Y and M of memory unit 28R are connected to the input of a respiratory resistance readout circuit 37R, and the outputs X, Y and M of memory units 28S are connected to a respiratory stiffness readout circuit 37S, each connected to properly scaled meters 38R and 38S to directly read respiratory resistance and stiffness. FIG. 5 shows a preferred form of circuits 37R and 37S with circuit 37R being specifically shown; it being understood that the following description also applies to circuit 37S. Circuit 37R includes an input terminal X connected to the input of an amplifier 39R which in turn is connected through a switching means such as relay 40R to a storage device 56, which may be a capacitor storing signal Ex. An input terminal Y is similarly connected to the input of an amplifier 41R which is in turn connected through relay 40R to a second storage device 57, which also may be a capacitor storing voltage Ey. The coil of relay 40R is connected to terminal M so that the contacts of relay 40R move from a normally open position to a closed position when terminal M is grounded through disc 32R. The stored potentials in storage devices 56 and 57 are combined through unity gain, high input impedance amplifiers 42R and 43R and a voltage divider comprising resistors 44R and 45R to provide a potential Ez, which is one-half the combined values of Ey and Ex. Potential Ez is conducted through a scaling resistor or potentiometer 46R and a meter amplifier 47R to a meter 38R which directly reads respiratory resistance.

It may be desirable to utilize different frequencies of forced oscillations from pump 10 particularly where the apparatus is being used as a laboratory instrument, and this can be done by changing the angular velocity $w$ of synchronous motor 15. Since angular velocity $w$ is only a factor in determining total respiratory resistance (see Equations 1 and 2) only the readout meter 38R for respiratory resistance need be scaled to reflect different frequencies of oscillation. The speed of motor 15 could be a continuously variable D. C. motor or be switched between different speeds. For example, as shown in FIG. 4, motor 15 may be a two speed sychronous motor operated at 1 r.p.s. and 2 r.p.s. and with the switching between these speeds controlled by a two speed switch 48. As illustrated, switch 48 can also be connected to a relay 49 to switch in different values of scaling resistor 46 to permit meter 38R to directly read respiratory resistance at both 1 and 2 r.p.s. of motor 15. In the example given, the signal would be scaled to ½ for the higher speed since it is necessary to scale the signal in inverse proportion to $w$.

FIG. 6 shows the equivalent circuits of capacitor memory unit 28R at each of sampling times $t_0$–$t_9$, and FIG. 7 shows the various potentials Ex, Ey and Ez representing the sampled pressures Pa at sampling times $t_0$–$t_9$, so that Equation (3) is satisfied. Using FIG. 3 as a reference, the electrical value corresponding to pressure $P_0$ is sampled and stored in capacitor $C_1$ at time $t_0$, the electrical value corresponding to pressure $P_2$ is sampled and stored in capacitor $C_2$ at time $t_2$, and the electrical value corresponding pressure $P_4$ is sampled and stored in capacitor $C_3$ at time $t_4$. At time $t_1$ the stored value corresponding to $P_0$ is transferred to capacitor 57 and at time $t_5$ the combined stored values corresponding to $P_0$–$P_2$ and $P_4$–$P_2$ are transferred to capacitors 56 and 57 respectively where they are combined and divided in half to provide $Ez = \frac{1}{2}(P_0 + P_4 - 2P_2)$. This process continues through cycles $t_6$–$t_9$ when the electrical values now corresponding to $P_4$, $P_6$ and $P_8$ are sampled, stored and combined.

If the difference in phase relationship of curves 24 and 25 are taken into account, then similar circuits could be drawn for illustrating the equivalent circuits of memory unit 28C at each of times $t_0$–$t_9$ for satisfying Equation (4); it being understood that, for example, the equivalent circuit to $t_0$ of FIG. 6 would appear at time $t_1$ for memory unit 28C. Thus, where in the example shown the pressure Pa at times $t_0$, $t_2$ and $t_4$ are respectively stored in capacitors $C_1$, $C_2$ and $C_3$ of capacitor memory unit 28R, the pressure Pa at time $t_1$, $t_3$ and $t_5$ would be respectively stored in corresponding capacitors $C_1$, $C_2$ and $C_3$ (not shown) of memory unit 28C.

Of course, other forms of switching and storage circuits may be utilized by this invention to satisfy Equations (3) and (4). For example, the switching sequence of capacitors $C_1$, $C_2$ and $C_3$ between receiving the sampled pressures Pa and combining these pressures to get the appropriate value of Ex may be controlled by an electronic timing and gating circuit. The time sequence of such circuits could be controlled directly by indexing the angular position of shaft 14 to provide times $t_0$–$t_9$ at each of the steps of sampling, storing and combining required, or since a constant angular velocity of motor 15 is employed only one position of shaft 14 corresponding to each positive and negative peak of curve 23, need be indexed. Then the remaining steps corresponding to those shown in FIG. 6 could be preformed under the control of electronic timing circuits. For example, collimator 26 can be arranged so that separate light pulses are generated at times corresponding to the positive peaks of each of curves 24 and 25, which pulses are distinguishable from light pulses which are generated by collimator 26 at times corresponding to each of the negative peaks of these curves. These pulses can then be used to trigger gate circuits connected between storage capacitors or other storage devices corresponding to $C_1$, $C_2$ and $C_3$ to load the sampled values of Pa into these devices at the appropriate sampling times, and to generate appropriate timing pulses to trigger a switching circuit for combining the stored values.

Also, whether mechanical switching as shown in FIG. 8 or electronic switching is employed, it may be desirable to provide a short delay in readout at meters 38R and 38S until the sampling and combining of the values of Pa has been stabilized, for example, after two full cycles of the alternating pressure Pa.

In order to protect pump 10 from being fouled by phlegm or mucus, a limp diaphragm 50 assembly is preferably connected between pump 10 and mouthpiece 16a, as illustrated in FIG. 4. Assembly 50 includes a sealed housing 51 preferably formed of two pieces hinged together at 52 and bolted together at 53 to permit easy opening and cleaning, and a diaphragm element 54 mounted in housing 50. Pressure transducer 20 may be connected to housing 50 through an outlet 55 which may be mounted at the position shown on the mouthpiece side of diaphragm element 54, as shown in FIG. 4, or alternatively, on the pump side of diaphragm element 54 when conditions are such that the pressures on each side of diaphragm element 54 are substantially equal. Also, the pressure Pa may be determined at the sampling time without a separate pressure transducer by sampling the reaction force on piston 11, which will be proportional to the pressure at inlet 16a, and converting this reaction force to an electrical signal.

From the foregoing it will be seen that this invention is one well adapted to attain all of the ends and objects hereinabove set forth, together with other advantages which are obvious and which are inherent to the apparatus and methods disclosed.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus adapted for measuring mechanical properties of the human respiratory system comprising, in combination: pump means adapted for forcing a pulsating known volume of gas into and out of such a respiratory system at a known frequency, said pulsating volume of gas adapted to cause fluctuations in the gas pressure adjacent the inlet of such a respiratory system when applied thereto; and inlet pressure sampling means adapted for sampling the gas pressure adjacent such an inlet, said sampling means responding to said pump means to sample said gas pressure only at selected points in time during the time that said pulsating volume of gas is applied to said respiratory system, said sampling means including means adapted to sample the gas pressure adjacent such inlet at a plurality of first points in time during the time that gas is being forced into and out of such a respiratory system, and second means adapted to sample such gas pressure at a second plurality of selected points in time during the time that gas is being forced into and out of such a respiratory system, said selected points in time being such that said sampled pressures are proportional to one of respiratory resistance, or dynamic stiffness.

2. The apparatus of claim 1 wherein the sampled pressures at said inlet include the residual pressure of the respiratory system, and wherein said sampling means includes means for effectively cancelling said residual pressure from the results obtained.

3. The apparatus of claim 1 further including respiratory resistance electrical readout means coupled to said sampling means and responding to said sampled pressures proportional to respiratory resistance to provide a visual readout of substantially the value of total respiratory resistance of said respiratory system.

4. The apparatus of claim 3 wherein said electrical readout means includes means responding to the frequency of said pulsating volume of gas to provide for a direct readout of said respiratory resistance at different frequencies of said pulsating volume.

5. The apparatus of claim 1 further including respiratory stiffness electrical readout means coupled to said sampling means and responding to said sampled pressures proportional to respiratory stiffness to provide a visual readout of substantially the value of dynamic stiffness of said respiratory system.

6. The apparatus of claim 1 further including a limp diaphragm adapted to be connected between said pump means and such a respiratory system.

7. Apparatus adapted for measuring mechanical properties of the human respiratory system comprising, in combination: pump means adapted for forcing a pulsating known volume of gas into and out of such a respiratory system at a known frequency, said pulsating volume of gas adapted to cause fluctuations in the gas pressure adjacent the inlet of such a respiratory system when applied thereto; and inlet pressure sampling means for sampling the gas pressure adjacent such an inlet, said sampling means including means responding to said pump means to sample said gas pressure only at selected points in time during the time that said pulsating volume of gas is applied to such a respiratory system, said selected points in time being such that said sampled pressures are proportional to one of respiratory resistance, or dynamic stiffness, and the sampled pressures at said inlet including the residual pressure of the respiratory system, said sampling means further including means for effectively cancelling said residual pressure from the results obtained, said last mentioned means including storage means for separately storing values of said sampled pressures taken at at least two successive but alternate sampling times when said sampled pressures are proportional to one of said respiratory resistance or stiffness, and means responding to said separately stored sampled pressures to provide a pressure value substantially proportional to said one of respiratory resistance or stiffness.

8. The apparatus of claim 7 wherein said means for separately storing successive but alternate sampled pressures includes means for storing separately the value of two successive positive sampled pressures proportional to said one of respiratory resistance or stiffness, and the value of the intermediate negative sampled pressure proportional to said one of respiratory resistance or stiffness, and wherein said means responding to said stored sampled pressures includes means for summing said successive positive sampled pressures and subtracting from this sum twice the value of said intermediate negative peak of sampled pressures.

9. Apparatus adapted for measuring mechanical properties of the human respiratory system comprising, in combination: pump means adapted for forcing a pulsating known volume of gas into and out of such a respiratory system at a known frequency, said pulsating volume of gas adapted to cause fluctuations in the gas pressure adjacent the inlet of such a respiratory system when applied thereto; rotary drive means drivingly connected to said pump means, the rotary position of said drive means having a fixed relationship to the flow and volume displacement of said gas; and inlet pressure sampling means for sampling the gas pressure adjacent such an inlet, said sampling means responding to said pump means to sample said gas pressure only at selected points in time during the time that said pulsating volume of gas is applied to such respiratory system, said selected points in time being such that said sampled pressures are proportional to one of respiratory resistance, or dynamic stiffness, said sampling means including indexing means responding to the rotary position of said drive means to provide said selected points in time when said flow and volume displacement of said gas are substantially peaked.

10. The apparatus of claim 9 wherein said sampling means includes means providing electrical values proportional to said sampled pressures at said selected points in time, and further includes storage means responding to said indexing means for separately storing such electrical values taken at at least two successive but alternate sampling times so that each of said sampled pressures includes a pressure value proportional to said one of respiratory resistance or stiffness, and a pressure value corresponding to a residual pressure of the respiration system; and means responding to said separately stored electrical values for combining said electrical values to provide another electrical value substantially proportional to the value of said sampled pressures less said residual pressures at said successive sampling times.

11. The apparatus of claim 10 wherein said storage means includes a plurality of capacitors each for separately storing each of said separately stored electrical values, and said last-mentioned means includes switch means responding to said indexing means for selectively storing said separately stored electrical values in said capacitors and selectively combining said stored electrical values to provide a composite electrical signal having a measurable electrical value proportional to said one of respiratory resistance or stiffness.

12. The apparatus of claim 10 wherein said storage means and indexing means includes a rotary capacitor memory unit drivingly connected to said rotary drive means to follow the rotation thereof, said capacitor memory unit including a plurality of rotary discs driven by a common shaft and a plurality of storage capacitors mounted on said disc and selectively connected during rotation of said disc to store separately at least three of said separately stored electrical values, and wherein said last-mentioned means is connected to said capacitor memory unit and responds at selected times during rotation of said capacitor memory unit to the stored electrical values in said storage capacitors to sum the first and third of said stored electrical value and subtract from this sum twice the intermediate stored electrical value.

13. The apparatus of claim 12 including means whereby said first and third of said stored electrical values are proportional to positive peaks of the sampled alternating pressure proportional to respiratory resistance, and the intermediate stored electrical value is proportional to the negative peak of the sampled alternating pressure intermediate said first and third peaks and proportional to respiratory resistance.

14. The apparatus of claim 12 including means whereby said first and third of said stored electrical values are proportional to positive peaks of the sampled alternating pressure proportional to respiratory stiffness, and the intermediate stored electrical value is proportional to the negative peak of the sampled alternating pressure intermediate said first and third peaks and proportional to respiratory stiffness.

15. A method of determining mechanical properties of the human respiratory system, including respiratory resistance and stiffness in such a respiratory system, said method comprising the steps of: forcing a pulsating predetermined volume of gas into and out of said respiratory system at a known frequency, said pulsating volume causing fluctuations in the gas pressure adjacent the inlet to said respiratory system; sampling the gas pressure adjacent said inlet in response to said pulsating volume of gas at selected points in time to determine resistive and reactive components of said pressure respectively proportional to respiratory resistance and stiffness, said sampling step including the steps of determining a plurality of first points in time during the time that gas is being forced into and out of such a respiratory system when the flow of said gas is substantially peaked, sampling the inlet gas pressures of said respiratory system at said first points in time, said sampled pressures being substantially proportional to total respiratory resistance, determining a plurality of second points in time during the time that gas is being forced into and out of such a respiratory system when the volume displacement of said gas is substantially peaked, and sampling the inlet gas pressures of said respiratory system at said second points in time, said sampled pressures being substantially proportional to dynamic respiratory stiffness; and utilizing at least a part of said sampled pressures to obtain measurable indications proportional to total respiratory resistance and stiffness of said respiratory system.

16. The method of claim 15 wherein a constant rotary motion is utilized to force said known volume into and out of said respiratory system, and said first and second points in time are determined by indexing said rotary motion.

17. The method of claim 16 wherein said sampled pressures include values equal to residual pressures of the respiratory system, and further including the step of cancelling said residual pressure from said measurable indication.

18. The method of claim 17 wherein said cancelling step includes the steps of averaging the values of successive, sampled pressures proportional to one of respiratory resistance or stiffness.

19. The method of claim 18 wherein said averaging step includes the steps of separately storing the values of three successive sampled pressures proportional to said one of respiratory resistance or stiffness, combining the first and third of said stored values, and subtracting from this sum twice the intermediate stored value.

* * * * *